United States Patent [19]
Uchida

[11] Patent Number: 4,784,255
[45] Date of Patent: Nov. 15, 1988

[54] SPINNING BOBBIN TRANSPORTING DEVICE

[75] Inventor: Hiroshi Uchida, Oumihachiman, Japan

[73] Assignee: Murata Kikai Kabushiki Kaisha, Kyoto, Japan

[21] Appl. No.: 650,286

[22] Filed: Sep. 12, 1984

[30] Foreign Application Priority Data

Sep. 16, 1983 [JP] Japan ............................ 58-143564[U]

[51] Int. Cl.⁴ ............................................. B65G 47/26
[52] U.S. Cl. ................................ 198/456; 198/465.1; 198/803.01; 242/35.5 A
[58] Field of Search ............ 198/465.1, 465.2, 803.01, 198/456, 803.12; 242/35.5 A; 57/281, 276

[56] References Cited

U.S. PATENT DOCUMENTS

| | | |
|---|---|---|
| 3,195,298 | 7/1965 | Furst .................... 57/1 R X |
| 3,410,406 | 11/1968 | Tsuda et al. ................. 57/281 X |
| 4,181,228 | 1/1980 | Hashimoto et al. ........... 242/35.5 A |
| 4,432,190 | 2/1984 | D'Agnolo ............................ 57/276 |
| 4,463,909 | 8/1984 | Kiriake et al. ................ 242/35.5 A |
| 4,566,263 | 1/1986 | Miyazi et al. .................... 57/281 X |

Primary Examiner—Robert J. Spar
Assistant Examiner—D. Glenn Dayoan
Attorney, Agent, or Firm—Spensley Horn Jubas & Lubitz

[57] ABSTRACT

A spinning bobbin transporting device for a fine spinning winder of the type including a circulating closed loop along which a spinning bobbin spun on a fine spinning frame is erectly fitted on a carrier and is transported by means of a carrier transporting path to a winder. The fine spinning fram and the winder are connected to each other by inclined transporting paths to form the circulating closed loop.

6 Claims, 7 Drawing Sheets

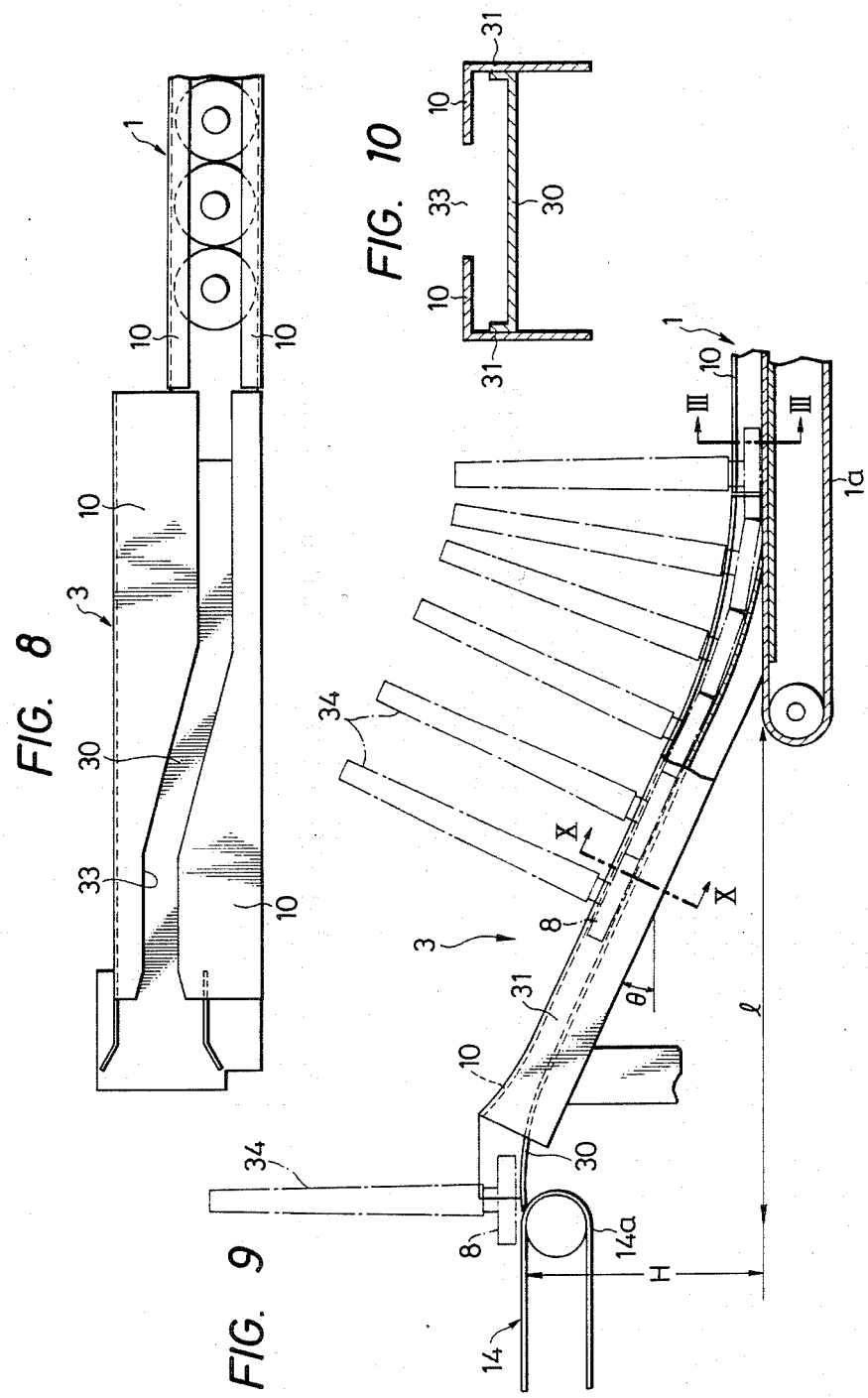

4,784,255

SPINNING BOBBIN TRANSPORTING DEVICE

BACKGROUND OF THE INVENTION

1. Field of the Invention

This invention relates to a spinning bobbin transporting device which connects a fine spinning frame and a winder which receives spinning bobbins erectly supported on carriers from the fine spinning frame to find and pick up ends of yarns thereon and takes up the yarns from the spinning bobbins on the carriers directly onto packages whereafter it discharges the carriers with the thus emptied bobbins thereon.

2. Prior Art

There is a system which supplies spinning bobbins erectly supported on carriers and winds up yarns from the spinning bobbins while they are supported on the carriers thus supplied whereafter it discharges the carriers with the thus emptied bobbins. Such a system for transporting spinning bobbins and empty bobbins has, when compared with conventional systems, various advantages that it eliminates the necessity of a step of fitting a spinning bobbin onto a peg of a winder after it has been supplied into a magazine, thus simplifying a spinning bobbin supplying step; since there is no necessity of provision of a magazine or a chute in front of a winder, yarns can be directly observed from a condition thereof on carriers until they are rewound onto packages, and hence troubles during widing can be discovered rapidly; since, during transporation, spinning bobbins do not contact with other spinning bobbins or machine components or are not subject to strong falling shocks, soiling to layers of yarns or an accident such as entanglement of yarns will not occur; and so on. In designing a fine spinning winder suitable for use in production of many products in small quantities wherein such a winder is directly connected to a fine spinning frame, it is difficult to contain a transporting face of a carrier path around the fine spinning frame and another transporting face of a carrier path around the winder in a same horizontal plane due to restrictions by the construction of the fine spinning frame or winder, and normally the latter transporting face is located at a higher position than the former transporting face. In order to eliminate this fall or difference in height, it is only necessary either to install one of the machines at a different vertical position from that of the other machine so that a transporting face around the fine spinning frame may coincide with another transporting face around the winder or to install a body of the fine spinning frame at a corresponding higher position. But this solution has defects that it required much expenses and that operation of the machine becomes more difficult.

Meanwhile, where a winder and a fine spinner frame are produced at different makers, relative vertical positions of bobbin transporting faces, when the winder and the fine spinning frame are to be installed in contiguous relationship, may vary depending upon combinations of such machines since such machines are designed and produced in unique designs by the individual makers.

SUMMARY OF THE INVENTION

It is an object of the present invention to provide a spinning bobbin transporting device for a fine spinning winder of the type including a circulating closed loop along which a spinning bobbin spun on a fine spinning fram is erectly fitted on a carrier and is transported by means of a carrier transporting path to a winder at which a yarn is unwound from the spinning bobbin and wound onto a package whereafter the carrier having a thus emptied bobbin carried thereon is returned to the fine spinning frame, wherein the circulating path can be constituted without a trouble even if the fine spinning frame and the winder are located at different heights. Thus, the spinning bobbin transporting device of the present invention is characterized by an inclined transporting path which connects the fine spinning frame and the winder to each other.

By this construction, the spinning bobbin transporting device of the invention can transport spinning bobbins carried on carriers from the fine spinning frame to the winder without any adjustment of relative vertical positions of the fine spinning frame and the winder. Accordingly, the aforementioned advantages of the system in which a fine spinning frame and a winder is connected by means of a transporting path and winding is effected while a spinning bobbin is carried on a carrier can be exhibited satisfactorily, thereby improving the working property of the system.

In addition, even in the case a bobbin transporting path on the fine spinning frame side and a carrier accepting transporting path on the winder side are displaced from each other in height and in a horizontal direction, both paths can be easily connected to each other only if the configurations of the inclined connecting transporting paths are modified. Thus, a closed loop for transporting a bobbin which circulates between a fine spinning frame and a winder can be constituted without considerable modification of the system.

BRIEF DESCRIPTION OF THE DRAWINGS

FIG. 8 is an enlarged plan view of a connecting transporting path at a carrier discharging portion which is diagrammatically shown in FIG. 1;

FIG. 9 is a side elevational view of the connecting transporting path of FIG. 8;

FIG. 10 is a cross sectional view taken along line X—X of FIG. 9;

DETAILED DESCRIPTION OF THE INVENTION

Description will first be given of a combination with a winder of a fine spinning frame which has a transporting path 1 of a first embodiment shown in FIGS. 1 to 10.

Figure 2:
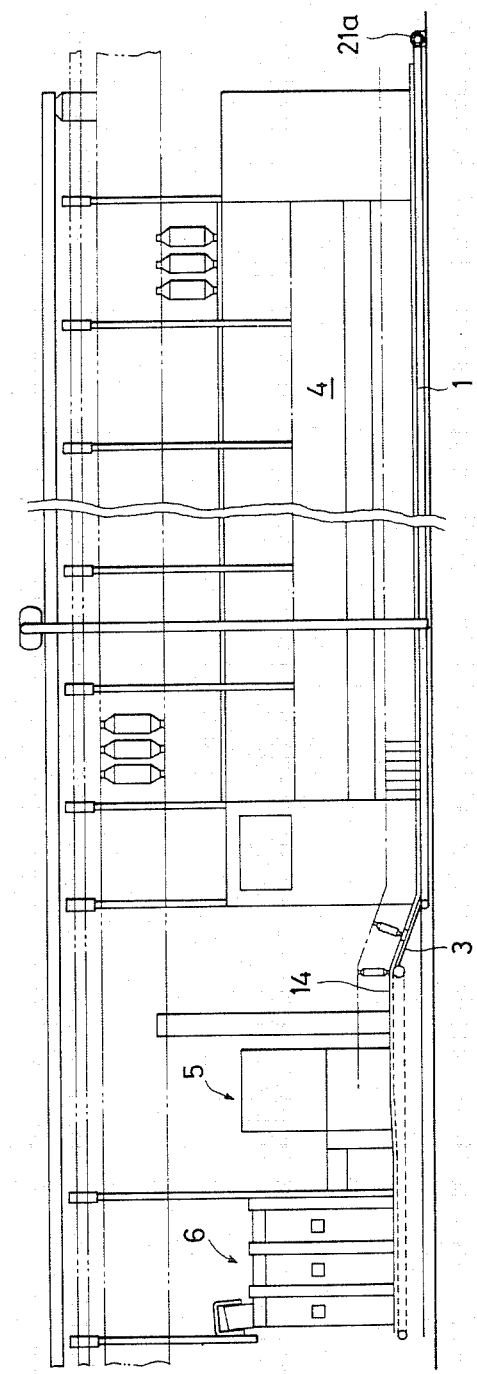
FIG. 2 is a front elevational view of the device of FIG. 1.

In this arrangement, the spinning bobbin transporting path 1 on the fine spinning frame side is located at a position below spinning bobbin transporting paths 12 and 14 on the winder side, as shown in FIG. 2.

The spinning bobbin transporting path 1 on the spinning frame side includes belt conveyors 1a, 1b and 1c which extend along front and rear and one side of a fine spinning frame 4. The arrangement further includes a yarn end finder 5 and a winder 6, and carrier accepting paths 12 and 13, a carrier returning transporting path 14, a bypass path 16, and transporting paths 15, 17 and 18 interconnecting those paths. The carrier accepting path 12 for the winder 6 including the yarn end finder 5 and the carrier returning transporting path 14 are connected to the spinning bobbin transporting path 1 on the fine spinning frame side by way of connecting paths 2 and 3, respectively, thereby to form a closed loop.

The carrier accepting transporting paths 12 and 13 are each constituted from a belt conveyor 12a connected to be driven by a motor 45a, and guide plates 10 and a bottom plate 30 which are arranged in a similar manner to those of the spinning bobbin transporting path 1 on the fine spinning frame side as described hereinafter. Also, the carrier returning transporting path 14 and the bypass path 16 are each constituted from a belt conveyor 14a or 16a connected to be driven by another drive motor 45b, and guide plates 10 and a bottom plate 30.

Figure 1:
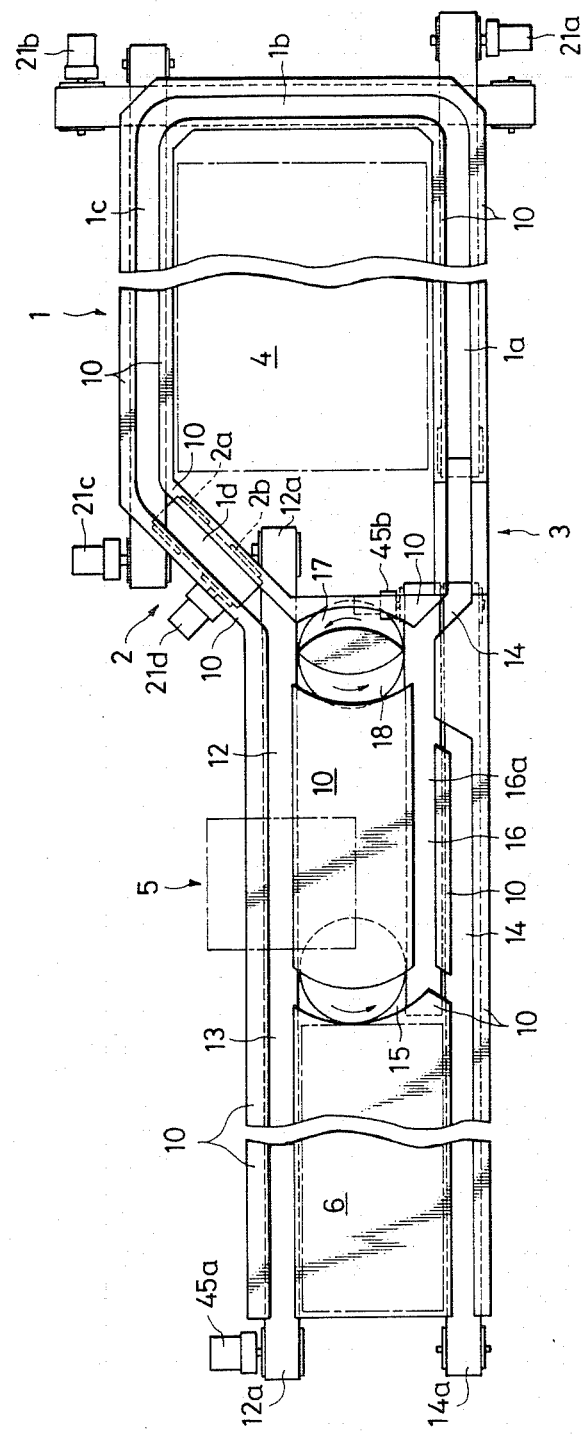
FIG. 1 is a plan view showing, in diagrammatic representation, a device of the present invention which employs a conveyor of a first embodiment.
Figure 3:
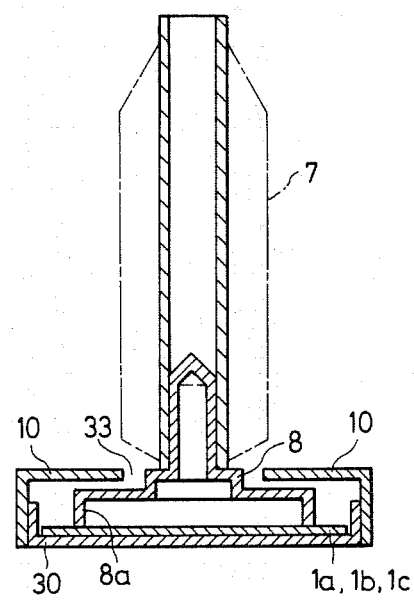
FIG. 3 is a cross sectional view illustrating a carrier being transported on the conveyor of FIG. 1.

The belt conveyors 1a, 1b and 1c which constitute the spinning bobbin transporting path 1 on the fine spinning frame side are located adjacent to each other at individual ends thereof to thus form a continuous carrier path surrounding the fine spinning frame 4. The carrier path has a cross section as shown in FIG. 3, and as seen from the cross sectional view, the carrier path is constituted such that the bottom plate 30 supports thereon the conveyor belt 1a, 1b or 1c which can travel with a carrier 8 carrying a spinning bobbin 7 placed thereon and the guide plates 10 which are each bent horizontally at an upper end thereof extend along opposite sides of the bottom plate 30 and define therebetween a gap 33 forming a guideway for guiding the carier 8 therealong between the guide plates 10. Further, as shown in FIGS. 1 and 2, the arrangement further includes a drive motor 21a for driving the conveyor belt 1a, another drive motor 21b for driving the conveyor belt 1b, and a further drive motor 21c for driving the conveyor belt 1c.

As seen from FIG. 2, the spinning bobbin transporting path 1 on the fine spinning frame side is restricted by the construction of the fine spinning frame 4 such that it is located at a considerably lower position below the carrier returning transporting path 14. Similar relative positions exist between the carrier accepting transporting paths 12 and 13 on the rear side and the transporting path 1 on the fine spinning frame side. The connecting transporting paths 2 and 3 have transporting faces each including an inclined face of a gentle slope interconnecting such transporting paths at different vertical positions to each other. In this instance, the transporting face of the connecting transporting path 3 is constituted not from a conveyor belt such as the conveyor belts 1a, 1b and 1c of the transporting path 1 on the fine spinning frame side which is driven to travel but from a chute which has a readily slipping smooth surface in the form of a slide.

The connecting transporting path 2 must be constituted to allow a heavy spinning bobbin 7 after fine spinning to pass along an uphill slope. Accordingly, a first embodiment as shown in FIG. 1 has been worked out. In this embodiment, a conveyor belt 1d is driven to travel with a spinning bobbin 7 carried thereon. The conveyor belt 1d extends between the conveyor belt 1c and the conveyor belt 12 of the carrier accepting transporting path 12 on the winder side and is supported by means of pulleys 2a and 2b. The pulley 2b is located at a higher position than the pulley 2a so that the conveyor 1d extends in inclined relationship. The pulley 2b is connected to be driven by a motor 21d. The guide plates 10 are disposed contiguously to the guide plates provided above the conveyor belts 1c and 12a in order to allow carriers 8 to be guided continuously therealong.

Figure 6:
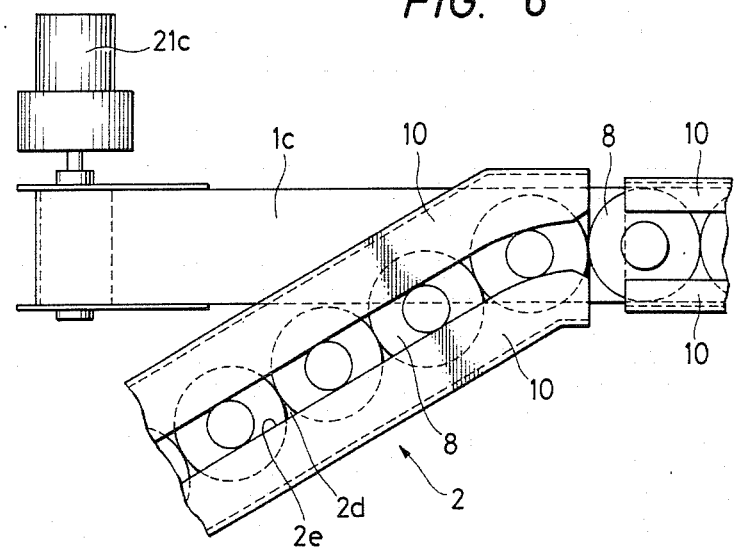
FIG. 6 is a plan view of a second embodiment of a connecting transporting path at a carrier admitting portion.
Figure 7:
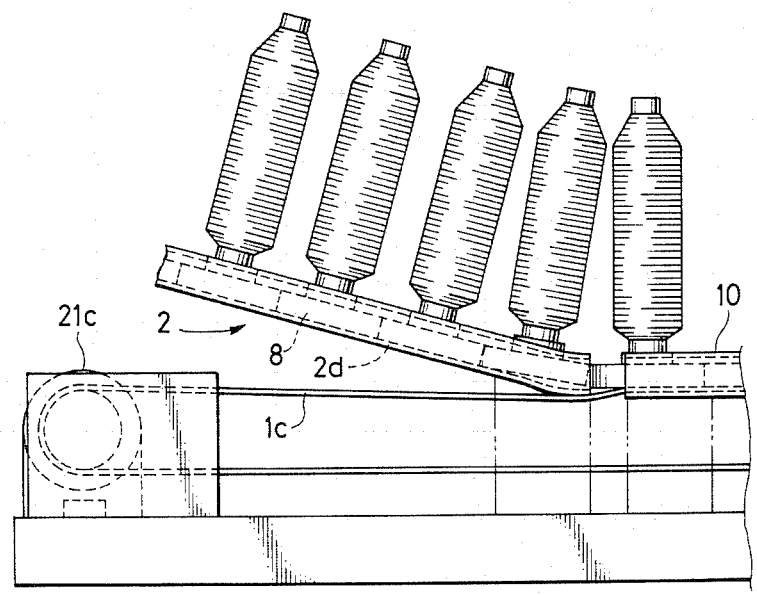
FIG. 7 is a side elevational view of the connecting transporting path of FIG. 6.

It is to be noted that the connecting transporting path 2 is not necessarily be constituted from a belt conveyor and may otherwise has a construction to allow carriers 8 to slide on and be pushed up a transporting face to an entrance of the carrier accepting transporting path 12. A second embodiment of this construction is illustrated in FIGS. 6 and 7. A pair of guide plates 10 which are bent horizontally at an upper end thereof extend along a bottom plate 2d which has an upper face serving as a transporting path. The guide plates 10 define therebetween a gap serving as a guideway 2e in the form of an open conduit having one end opened to an upper face of the conveyor 1c of the transporting path 1 on the fine spinning frame side and the other end opened to an upper face of the carrier accepting transporting path 12.

The connecting transporting path 3 includes an inclined, readily slipping bottom plate 30, and a pair of guide plates 10 each constituted from a side plate 31 which extend along either side of the bottom plate 30 and is bent horizontally at an upper end thereof. The guide plates 10 define therebetween a chute guideway 33 which provides a spacing to allow carriers 8 to fall therealong between the bottom plate 30 and the guide plates 10. The top end of the bottom plate 30 is located adjacent the conveyor 14a of the carrier returning transporting path 14 so as to allow the bottom plate 30 to accept a carrier 8 delivered from the conveyor 14a. In addition, the top ends of the guide plates 10 are rather expanded so as to facilitate such acceptance of a carrier 8.

Figure 5:
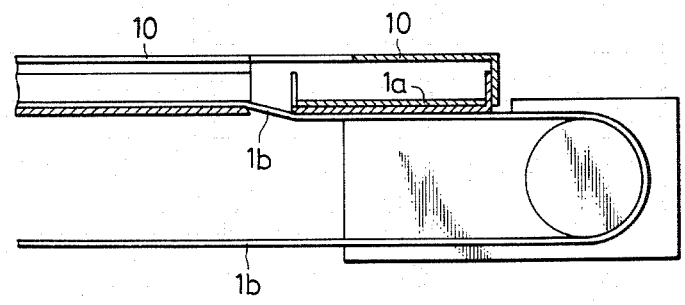
FIG. 5 is a cross sectional veiw taken along line V—V of FIG. 4.
Figure 4:
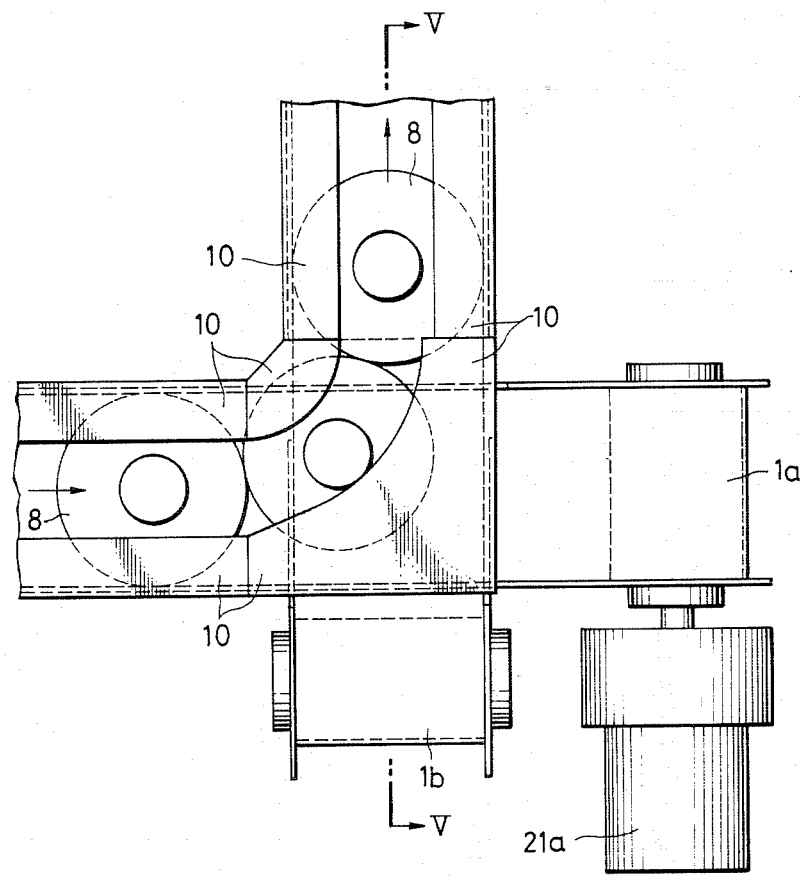
FIG. 4 is an enlarged plan view of a corner portion of the conveyor diagrammatically shown in FIG. 1.

The guideway 33 may be designed into any configuration by, for example, curving or bending the same in accordance with relative lateral positions of the carrier returning transporting path 14 and the transporting path 1 on the fine spinning frame side. Besides, the inclination angle ($\theta$) of the connecting transporting path 3 may be designed to be an angle which allows a carrier 8 having an empty bobbin 34 fitted erectly thereon to be assuredly fed on the bottom plate 30 to the horizontal transporting path 1 on the fine spinning frame side. Accordingly, the angle ($\theta$) is selectively determined in accordance with a difference in height between the carrier returning transporting path 14 and the transporting path 1 on the fine spinning frame side. In particular, when the height H in FIG. 5 is relatively small, the distance (l) is made small to locate the fine spinning frame 4 and the winder 6 relatively near to each other, but on the contrary when the height (H) is relatively large, the distance (l) is increased accordingly, thereby adjusting the angle ($\theta$).

The bottom end of the bottom plate 30 terminates at a position above the conveyor belt 1a of the transporting path 1 on the fine spinning frame side, and the guide plates 10 are connected in continuous relationship to the guide plates 10 on the conveyor belt 1a.

When spinning bobbins spun on the fine spinning frame are filled with yarns, the fine spinning frame effect doffing at all of spindles thereof to fit the fully wound spinning bobbins in place of empty bobbins fitted on carriers 8 on the transporting path 1a and 1c in front of the fine spinning frame. In this instance, empty bobbins on the transporting path 1b remain as they were.

Spinning bobbins spun on the fine spinning frame 4 and fitted on the carriers 8 each assume a position supported on a carrier 8 as shown in FIG. 2, and if there is a demand for a fully wound spinning bobbin from the winder 6, the spinning bobbins are fed on pitch on the transporting path 1 on the fine spinning frame side and thus fed one by one on the conveyors 1a, 1b and 1c until they are transferred onto the conveyor belt 1d of the connecting transporting path 2. Since the conveyor belt 1d is arranged in an inclinde condition, movement of the conveyor belt 1d moves the carriers 8 upwardly until they are transferred onto the conveyor 12 of the carrier accepting transporting path 12. Thus, the carriers 8 then are fed to the winder 6, passing the yarn end finder 5. In the arrangement shown in FIG. 7, the carriers introduced into the transporting path 2 are pushed by the carriers 8 placed on the conveyor belt 1c to move up along the transporting path 2 until they are introduced into the carrier accepting transporting path 12.

The carrier 8 on which empty bobbins after completion of unwinding of yarns thereon are carried are moved along the carrier returning transporting path 14 by circulation of the conveyor belt 14a and are pushed out onto the bottom plate 30 of the connecting transporting path 3. Consequently, the carriers 8 slip down along the top face of the bottom plate 30 due to the inclination of the bottom plate 30 unit they are transferred onto the conveyor belt 1a of the transporting path 1 on the fine spinning frame and are fed to the fine spinning frame 4.

Meanwhile, when empty bobbins which were positioned on the conveyor belt 1b of the fine spinning frame and hence have not been replaced by fully wound spinning bobbins are moved along the connecting transporting path 2 to the carrier accepting transporting path, a transporting path change-over device operates in response to a sensor not shown to cause the carriers having the empty bobbins fitted thereon to be introduced into a transporting path 18. The empty bobbins are then returned to the fine spinning frame 4 by way of the returning path 14.

Figure 11:
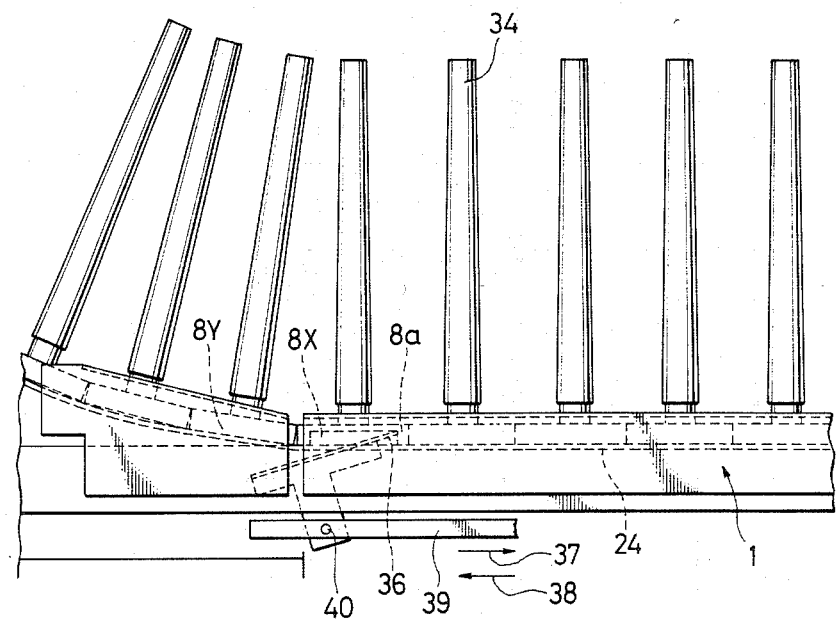
FIG. 11 is a side elevational view illustrating a pitch feeding device of a conveyor of a second embodiment.
Figure 12:
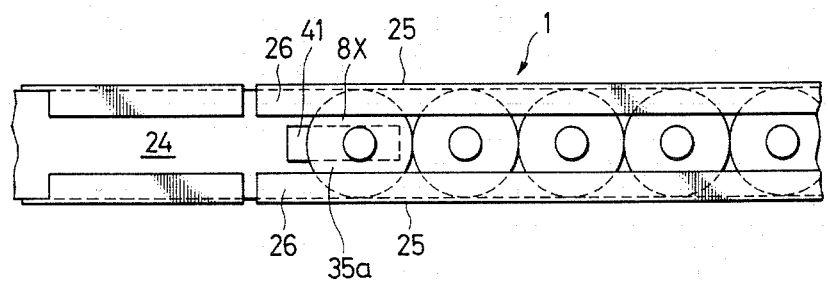
FIG. 12 is a plan view of the pitch feeding device of FIG. 11.

A second embodiment of the transporting path 1 on the fine spinning frame side will be described below with reference to FIGS. 11 and 12. In the second embodiment, feeding of carriers 8 on the transporting path 1 on the fine spinning frame side is effected by means of a pitch feeding member 36. The pitch feeding member 36 is supported for pivotal motion 40 on a rod 39 which is mounted for back and forth movement in directions of arrow marks 37 and 38. The pitch feeding member 36 is spring urged in a counterclockwise direction about the rod 39 to a position in which it extends upwardly through a slot 41 in a bottom plate 24 and abuts against an inner wall face 8a (see FIG. 3) of a carrier 8. In this position, the pitch feeding member 36 pushes the carrier 8X as it moves in the direction of the arrow mark 37, and as it moves in the direction of a the arrow mark 38, it is pivoted in a clockwise direction against the urging of the spring and is engaged with a succeeding carrier 8Y. By repetition of a sequence of such motions. carriers 8 are intermittently fed one by one.

The pitch feeding member 36 may be disposed at a plurality of positions along the transporting path on the fine spinning frame side. It is desirable that one pitch of the feeding of carriers 8 on the transporting path 1 coincides with the pitch of spindles of the fine spinning machine when the transporting path 1 is arranged in parallel to a row of the spindles.

In this way, a carrier transporting path in the form of a closed loop is formed by the transporting path 1 on the fine spinning frame side, and the carrier accepting transporting paths 12 and 13, carrier returning transporting path 14 and inclined connecting transporting paths 2 and 3 on the winder 6 side.

What is claimed is:
1. A bobbin transporting device for a spinning and winding system in which a winder and a fine spinning frame are provided in substantially adjacent relationship to each other, comprising:
 a carrier transporting path extending along at least a portion of the periphery of said fine spinning frame,
 a carrier accepting transporting path for said winder for accepting a carrier with a spinning bobbin thereon, said carrier accepting transporting path being connected to one end of said carrier transporting path,
 a carrier returning transporting path for returning a carrier with an empty bobbin thereon which is discharged from said winder, said carrier returning transporting path being connected to the other end of said carrier transporting path,
 said carrier transporting path and said carrier accepting transporting path being separated by a vertical distance $H_1$ and by a horizontal distance $l_1$,
 said carrier transporting path and said carrier returning transporting path being separated by a vertical distance $H_2$ and by a horizontal distance $l_2$,
 a first substantially linear connecting path inclined between said carrier transporting path and said carrier accepting transporting path at an angle $\theta_1$, where:

$$\tan \theta_1 = H_1/l_1$$

a second substantially linear connecting path inclined between said carrier transporting path and said carrier returning transporting path at an angle $\theta_2$ where:

$$\tan \theta_2 = H_2/l_2$$

whereby said carriers travel a vertical distance not greater than $H_1$ between said carrier transporting path and said carrier accepting transporting path, and
 whereby said carriers travel a vertical distance not greater than $H_2$ between said carrier returning transporting path and said carrier transporting path.

2. A bobbin transporting device according to claim 1, wherein at least one of said transporting paths is constituted from a belt conveyor.

3. A bobbin transporting device according to claim 1, wherein said carrier transporting path on the fine spinning frame side has a smooth face along which a carrier can slip.

4. A bobbin transporting device according to claim 1 or 2, wherein said carrier transporting path on the fine spinning frame side includes a pitch feeding member.

5. A bobbin transporting device according to claim 1, wherein at least one of said connecting paths has a smooth face along which a carrier can slip.

6. A bobbin transporting device according to claim 1, wherein each of said connecting paths includes a bottom plate, a side plate and a pair of guide plates, said guide plates defining therebetween a gap which serves as a guideway along which a carrier advances.

* * * * *